US010978097B1

(12) United States Patent
Paveza et al.

(10) Patent No.: US 10,978,097 B1
(45) Date of Patent: Apr. 13, 2021

(54) INDICATING TRACKS AS ERASED WITHOUT DELETING DATA FOR THE TRACKS

(71) Applicant: INTERNATIONAL BUSINESS MACHINES CORPORATION, Armonk, NY (US)

(72) Inventors: John R. Paveza, Morgan Hill, CA (US); Gail Spear, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/745,261

(22) Filed: Jan. 16, 2020

(51) Int. Cl.
G11B 5/09 (2006.01)
G11B 5/024 (2006.01)
G11B 27/34 (2006.01)

(52) U.S. Cl.
CPC ............. G11B 5/024 (2013.01); G11B 27/34 (2013.01)

(58) Field of Classification Search
None
See application file for complete search history.

(56) References Cited

U.S. PATENT DOCUMENTS

| 4,924,330 A * | 5/1990 | Seamons | G11B 11/10517 360/66 |
| 5,570,245 A * | 10/1996 | Fukushima | G11B 21/025 360/66 |
| 5,590,298 A * | 12/1996 | Kawamoto | G06F 11/1435 711/113 |
| 5,835,939 A * | 11/1998 | Kurokawa | G06F 3/0601 711/113 |
| 8,103,821 B2 | 1/2012 | Chang et al. | |
| 8,447,915 B2 | 5/2013 | Araki et al. | |
| 9,032,134 B2 | 5/2015 | Gorobets | |
| 10,114,743 B2 | 10/2018 | Heller et al. | |
| 10,324,664 B2 | 6/2019 | So et al. | |
| 10,387,328 B2 | 8/2019 | Flynn et al. | |

(Continued)

OTHER PUBLICATIONS

S. Diesburg, et al., "Trueerase: Leveraging An Auxiliary Data Path For Per-file Secure Deletion", Florida State University Library, 2016-08, pp. 39.

(Continued)

Primary Examiner — Peter Vincent Agustin
(74) Attorney, Agent, or Firm — David W. Victor; Konrad Raynes Davda & Victor LLP

(57) ABSTRACT

Provided are a computer program product, system, and method for indicating tracks as erased without deleting data for the tracks. In response to receiving erase commands to erase tracks in the storage, indicating the tracks as erased without performing an erase operation on the tracks subject to the erase command. Data in the storage for the tracks indicated as erased remains in the storage while requests are directed to the tracks indicated as erased. A command is received indicating an operation with respect to a target track. The operation to proceed is permitted with respect to the target track in response to determining that the target track is not indicated as erased. An alternate operation is performed providing a result different from the operation indicated in the command in response to determining that the target track is indicated as erased.

21 Claims, 7 Drawing Sheets

(56) References Cited

U.S. PATENT DOCUMENTS

| | | |
|---|---|---|
| 2001/0026518 A1* | 10/2001 | Shishido ................ G11B 27/24 369/53.24 |
| 2011/0264884 A1* | 10/2011 | Kim .................... G11C 16/349 711/170 |
| 2013/0007354 A1* | 1/2013 | Shiiba ................ G06F 12/0246 711/103 |
| 2014/0129785 A1 | 5/2014 | Deetz et al. |
| 2018/0046376 A1 | 2/2018 | Ioannou et al. |
| 2018/0108419 A1 | 4/2018 | Lin |
| 2018/0314444 A1 | 11/2018 | Jinzenji |
| 2019/0018601 A1 | 1/2019 | Dubeyko |
| 2019/0036704 A1 | 1/2019 | DeVetter et al. |

OTHER PUBLICATIONS

E. Gal, et al., "Algorithms and Data Structures for Flash Memories", ACM Computing Surveys, vol. 37, No. 2, Jun. 2005, pp. 138-163.

K. Onarlioglu, et al., "Eraser: Your Data Won't Be Back", 2018 IEEE European Symposium on Security and Privacy (EuroS&P) Apr. 24-26, 2018, pp. 14.

J. Reardon, et al., "Data Node Encrypted File System: Efficient Secure Deletion for Flash Memory", Department of Computer Science, ETH Zurich, USENIX Security Symposium, pp. 333-348, 2012.

* cited by examiner

INDICATING TRACKS AS ERASED WITHOUT DELETING DATA FOR THE TRACKS

BACKGROUND OF THE INVENTION

1. Field of the Invention

The present invention relates to a computer program product, system, and method for indicating tracks as erased without deleting data for the tracks.

2. Description of the Related Art

In current data storage systems, when a file or data set is updated and subsequently closed, the operating system may partially release space which is no longer needed. Also, when a data set or file is no longer needed, the operating system will release all the space formerly associated with the file. This operation is referred to as "scratching" (i.e., deleting) a data set. As part of the scratch operation, the operating system updates a file directory or Volume Table of Contents (VTOC) to indicate the file or data set is no longer available. Although the logical link to a file is removed, the data for the file will remain on storage. Thus, a malicious process may access the data for a file that has been deleted in the operating system, but where the data still remains in storage.

To ensure that the data for a deleted file is actually erased, the operating system may write one or more times all zeros or some other random or predetermined string to every block or track associated with a deleted file to make the data no longer accessible. With large files, the physical erase operation involving multiple writes may be very time consuming, resulting in significant latency to complete an erase operation. Due to this delay, customers are hesitant to employ an "erase on scratch" operation to overwrite the actual data when deleting a file.

There is a need in the art for improved techniques and performance when performing the erase on scratch operation.

SUMMARY

Provided are a computer program product, system, and method for indicating tracks as erased without deleting data for the tracks. In response to receiving erase commands to erase tracks in the storage, indicating the tracks as erased without performing an erase operation on the tracks subject to the erase command. Data in the storage for the tracks indicated as erased remains in the storage while requests are directed to the tracks indicated as erased. A command is received indicating an operation with respect to a target track. A determination is made as to whether the target track is indicated as erased. The operation to proceed is permitted with respect to the target track in response to determining that the target track is not indicated as erased. An alternate operation is performed providing a result different from the operation indicated in the command in response to determining that the target track is indicated as erased.

DETAILED DESCRIPTION

Described embodiments provide improvements to computer technology to process erase commands to erase tracks, such as blocks, of data in a manner that reduces the latency in processing erase commands by indicating a track as erased and returning complete to the erase command before actually erasing the data, which requires time consuming write operations to overwrite the tracks to erase. With described embodiments, before processing read or write requests to tracks, a determination is made whether the tracks are indicated as erased to ensure that access is not provided to data in tracks that are indicated as erased, but not necessarily physically erased. If an access is to a track indicated as erased, then an alternate operation may be performed that is different than the operations specified by the access request, such as to fail the access request or, for a read request, to return a predetermined string of data, such as all zeros, that is different from the data stored on the track. In this way, latency to process erase commands is reduced and at the same time tracks are indicated as erased so that future access requests to the data indicated as erased, although not physically erased, are not permitted.

Figure 1:
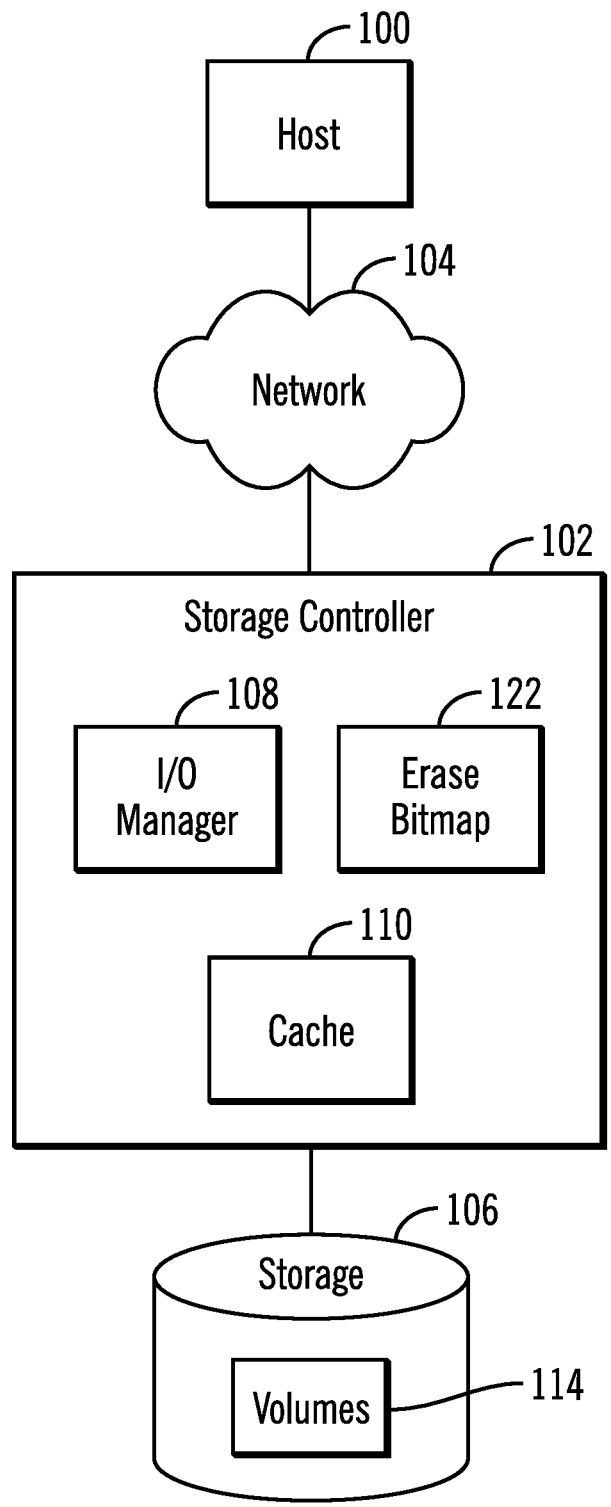
FIG. 1 illustrates an embodiment of a computing environment.

FIG. 1 illustrates an embodiment of a computer environment including one or more host systems 100 connected to a storage controller 102 over a network 104. The storage controller 102 manages access to volumes configured in logical subsystems in a storage 106. The storage controller 102 includes an I/O manager 108 to manage I/O operations directed to the storage 106, a cache 110 to cache tracks from the storage 106, and an erase bitmap 112 indicating tracks that are erased while the data for the tracks indicated as erased still remains in the storage 106 or cache 110.

The storage 106 includes volumes 114, where volumes may be configured in Logical Subsystems (LSS), where each LSS is comprised of multiple volumes 114. The term volume 114 as used herein may refer to other types of storage units comprising addressable ranges of data, such as logical devices, logical drives, partitions, etc. A track comprises any addressable storage unit representing data in storage and memory, and may the term "track" may also refer to other data units, including a block, logical address, logical block address (LBA), physical block address, etc.

In one embodiment, the erase bitmap 112 may comprise a bitmap having a cell for each track in a volume 114 that indicates whether the track is erased, or subject to an erase command, even though the data for the track indicated as erased has not been overwritten or removed from the storage 106. In an alternative embodiment, other types of data structures may be used to indicate whether a track is erased or not erased. In a still further embodiment, indication of whether a track is erased, i.e., subject to an erase command without the track data being overwritten or removed from storage 106, may be indicated in track or directory metadata.

The erase bitmap 112 indicates specific tracks indicated as erased without regard to a data set that includes the tracks.

The storage controller 102 may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world). The storage controller 102 also may comprise other types of servers and computing devices, such as a personal computer, laptop, personal information manager, etc.

The network 104 may comprise a Storage Area Network (SAN), Local Area Network (LAN), Intranet, the Internet, Wide Area Network (WAN), peer-to-peer network, wireless network, arbitrated loop network, etc.

The storage 106 may be implemented in one or more storage devices, or an array of storage devices, may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices in the storage 106, may comprise heterogeneous storage devices from different vendors and different types of storage devices, such as a first type of storage devices, e.g., hard disk drives, that have a slower data transfer rate than a second type of storage devices, e.g., SSDs or Flash drives.

Figure 2:
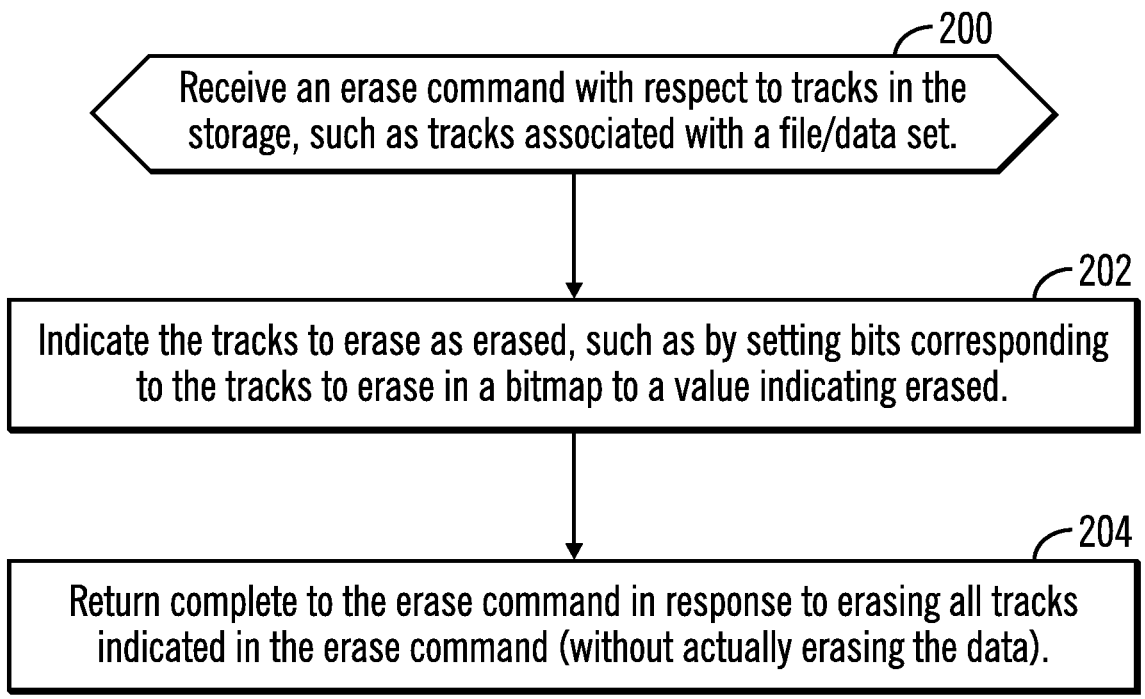
FIG. 2 illustrates an embodiment of operations to process an erase command.

FIG. 2 illustrates an embodiment of operations performed by the I/O manager 108 to processes an erase command with respect to tracks in the storage, such as tracks associated with a file. Upon receiving (at block 200) the erase command, the I/O manager 108 indicates (at block 202) the tracks to erase in the erase command as erased, such as by setting bits corresponding to the tracks to erase in the erase bitmap 122 to a value indicating erased. The I/O manager 108 returns (at block 204) complete to the erase command in response to indicating all the tracks as erased without actually erasing the data.

With the embodiment of FIG. 2, an erase is completed without having to perform the time consuming operation of overwriting data. Instead, with the described embodiment, the complete is returned very quickly to the erase command without the delay of having to perform overwriting of the tracks in the storage 106. If the user deletes a file or data set, then the operating system may issue erase commands to the I/O manager 108 to erase the tracks that comprise the deleted file or data set.

Further with the embodiment of FIG. 2, although the complete is returned to the erase command, data for the track erased remains in the storage 106, such that subsequent read and write commands are received for the track indicated as erased while the data for the track indicated as erased remains in the storage 106. However, access to the data for the track indicated as erased is not permitted through the operations of FIGS. 4-6 even though the data remains in the storage 106.

Figure 3:
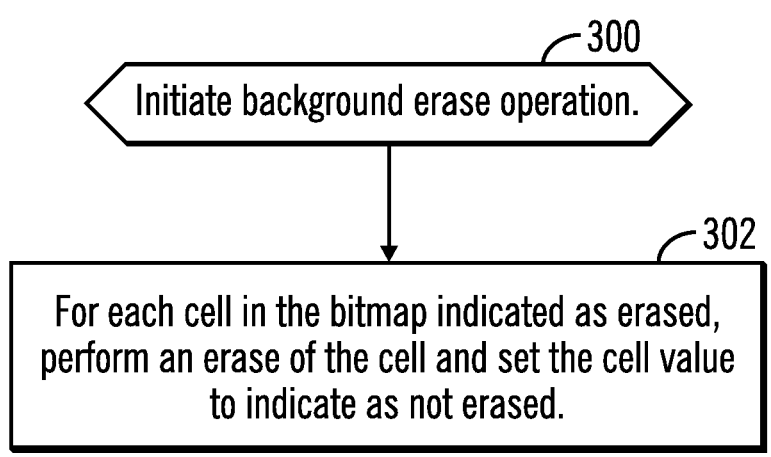
FIG. 3 illustrates an embodiment of operations to initiate a background erase operation.

FIG. 3 illustrates an embodiment of operations performed by the I/O manager 108 to initiate a background erase operation, which may be periodically initiated. Upon initiating (at block 300) the background erase operation, the I/O manager performs (at block 302), for each cell in the erase bitmap 112 indicated as erased, an erase of the cell and set the cell value to indicate as not erased. The erase operation may comprise overwriting the data for the tracks indicated as erased one or more times.

With the embodiment of FIG. 3, the actual physical erase operation to erase the tracks in the storage 10 indicated as erased in the erase bitmap 112 may be performed after complete is returned to the erase command. In this way, the erase operation that takes significant time may be performed in the background after the erase is indicated in the erase bitmap 112 to actually perform the erase at the storage 106 without delaying the processing of the erase command because complete is returned to an erase command after indicating the tracks as erased in the erase bitmap 112.

Figure 4:
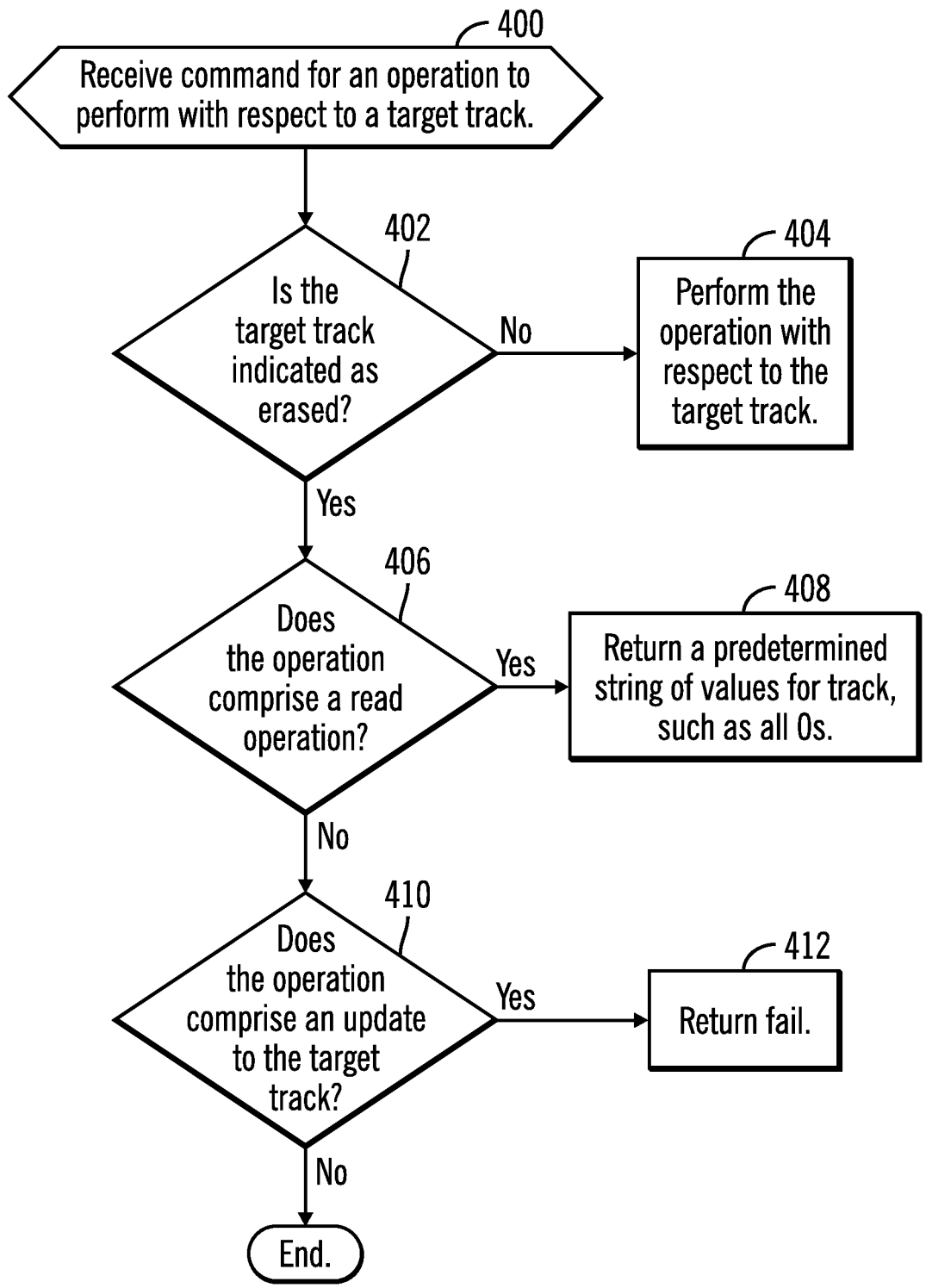
FIG. 4 illustrates an embodiment of operations to process a command to perform an operation with respect to a target track.

FIG. 4 illustrates an embodiment of operations performed by the I/O manager 108 to process different types of read and write operations to a target track to prevent returning data for a track indicated as erased that still remains in the storage 106. Upon receiving (at block 400) the command for the target track, if (at block 402) the target track is not indicated as erased, such as in the erase bitmap 112, then the operation of the command, e.g., read or write, is performed (at block 404) with respect to the target track. If (at block 402) the target track is erased, as indicated in the erase bitmap 112, and if (at block 406) the operation comprises a read operation, then a predetermined string of values, such as all zeroes, is returned (at block 408) to the request. This predetermined string may be the values that are overwritten to the track to perform an erase and are different than the data stored for the track in the storage 106. Further, the returned string may comprise other data different from the data stored for the requested track in the storage 106. If (at block (406) the operation is not a read and if (at block 410) the operation comprises an update to the target track, then fail is returned (at block 412) because the track is indicated as erased.

With the embodiment of operations of FIG. 4, the indication of whether a track is erased, even though the data for the track may remain in storage 106 or cache 110, determines how the read or write operation is processed to ensure that the operation does not allow reading or updating of an erased track. Further, with the described embodiments, the I/O manager performs an alternate operation different from the operation specified by the command, such as read or write, if the target track subject to the command is indicated as erased. For instance, for a read operation, the alternate operation may comprise returning a predetermined string of values for the target track indicated as erased that is different from the data stored for the target track in the storage 106. For a write, the alternate operation may comprise failing the write.

Figure 6:
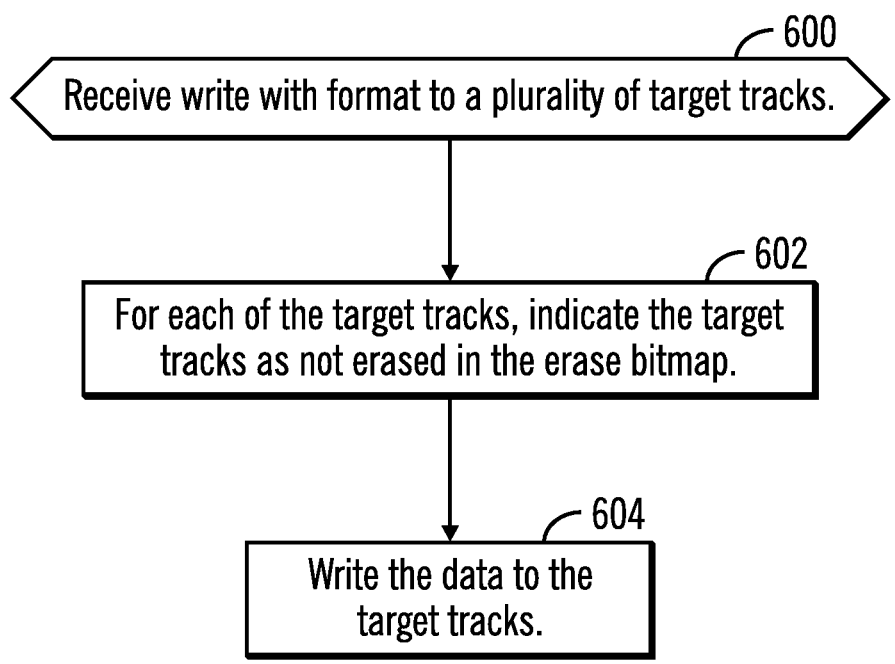
FIG. 6 illustrates an embodiment of operations to process a write with format command to a plurality of target tracks.

The handling in FIG. 4 of an update to data in a specific record on a track (operation is failed) is different than the handling of a "format write" command, described with respect to FIG. 6, which replaces the contents of the track with new data and allows the write to an erased track.

Figure 5:
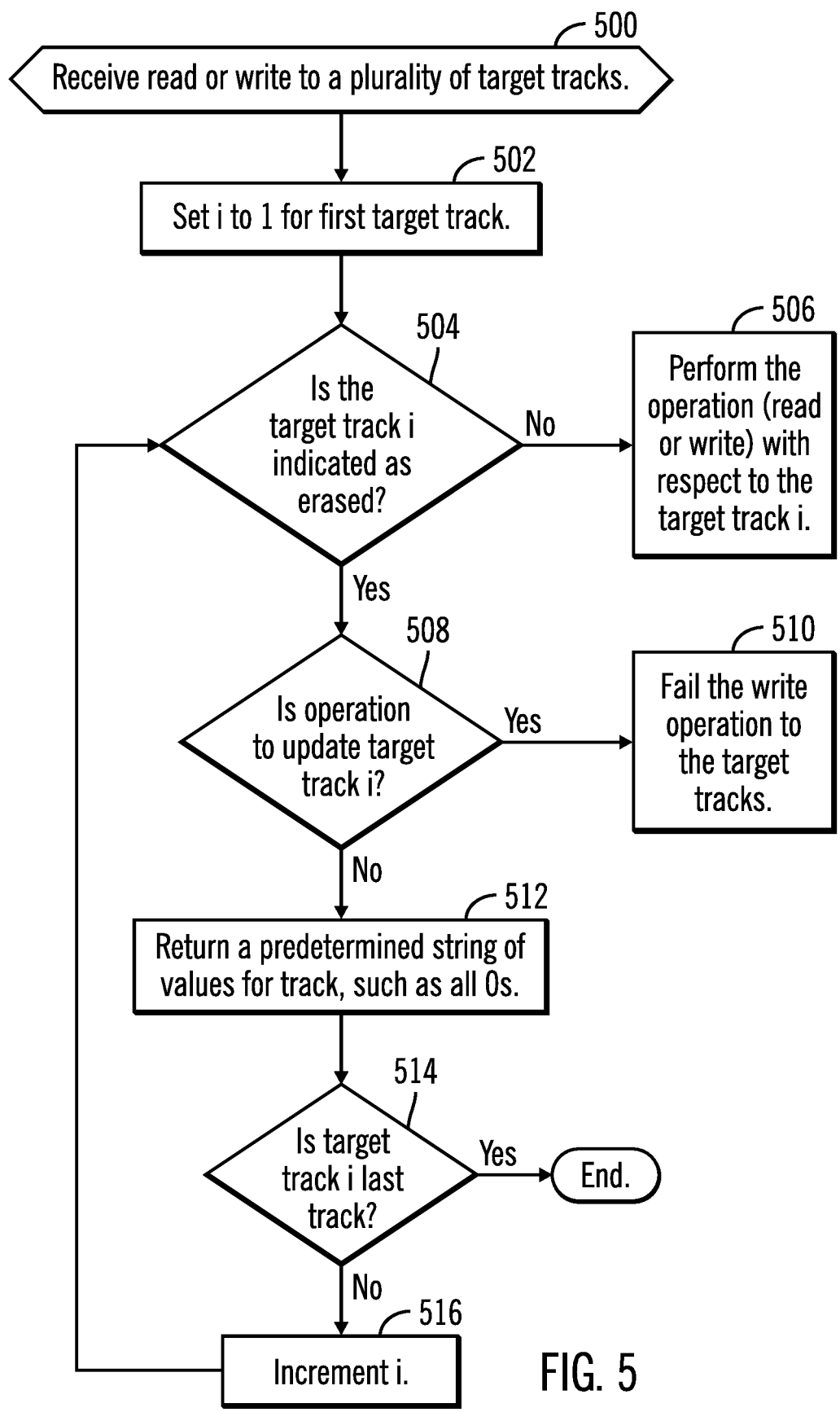
FIG. 5 illustrates an embodiment of operations to process a read or write command to a plurality of target tracks.

FIG. 5 illustrates an embodiment of operations performed by the I/O manager 108 to process a read or write to a plurality of target tracks. Upon receiving (at block 500) the read or write, a variable i is set (at block 502) to one for the first target track to process. If (at block 504) the target track i is indicated as not erased, such as in the erase bitmap 112, then the read or write operation is performed (at block 506) with respect to target track i. If (at block 504) the target track i is indicated as erased and if (at block 508) the operation is to update/write the target track i, then the write is failed (at block 510) and the write is terminated with respect to any further target tracks. If (at block 508) the operation is a read, then a predetermined string of values, such as all zeroes, is returned (at block 512). If (at block 514) the target track i is not the last track, then i is incremented (at block 516) and control proceeds to block 504 to process the next target track. If (at block 514) i is the last target track, then control ends.

With the embodiment of operations of FIG. 5, to process a read or write to a plurality of target tracks, the write is allowed to continue until a track indicated as erased is encountered, then the write is failed. Further, for a read, the read is allowed to continue and upon encountering target tracks indicated as erased, an erase string is returned.

In an alternative embodiment, the erase bitmap 112 may be scanned to determine if all target tracks are indicated as not erased. If so, then the read or write is allowed to proceed with respect to all the target tracks. Otherwise, if at least one target track is indicated as erased, the read or write is failed and not allowed to proceed with respect to any of the target tracks.

FIG. 6 illustrates an embodiment of operations performed by the I/O manager 108 to process a write with format to a plurality of target tracks. Upon receiving (at block 600) the write with format, for each of the target tracks, the I/O manager 108 indicates (at block 602) in the erase bitmap 112 the target tracks as not erased. The data is written (at block 604) to the target tracks that were subject to the erase.

With the embodiment of FIG. 6, for a write with format, the write is always allowed to proceed regardless of whether the target tracks are indicated as erased or not erased in the erase bitmap 112 because the target tracks are being formatted, and the target tracks are indicated as not erased due to the formatting.

Figure 7:
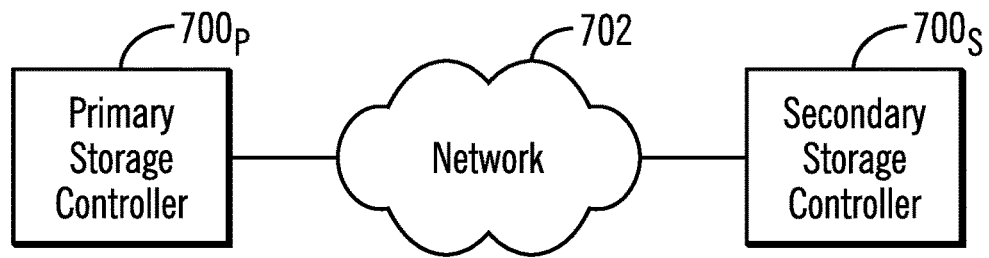
FIG. 7 illustrates an embodiment of a network computing environment to mirror data.

FIG. 7 illustrates an additional embodiment where the storage controller 102 of FIG. 1 may comprise a primary storage controller $700_P$ that is in a data mirroring or copy relationship with a secondary storage controller $700_S$. The primary $700_P$ and secondary $700_S$ storage controllers communicate over a network 702. The primary $700_P$ and secondary $700_S$ storage controllers may have the I/O manager 108, erase bitmap 112, cache 110, and storage 106 shown in FIG. 1, and each perform the operations described with respect to FIGS. 2-6. The primary $700_P$ and secondary $700_S$ storage controllers further include a copy manager to manage copy operations, such as creating point-in-time copies, such as a snapshot, FlashCopy® (FlashCopy is a registered trademark of IBM), snapshot, etc. The copy managers create point-in-time copy relationships, where each point-in-time copy relationship represents a point-in-time copy of one or more volumes 114 configured in the storage 106.

Figure 8:
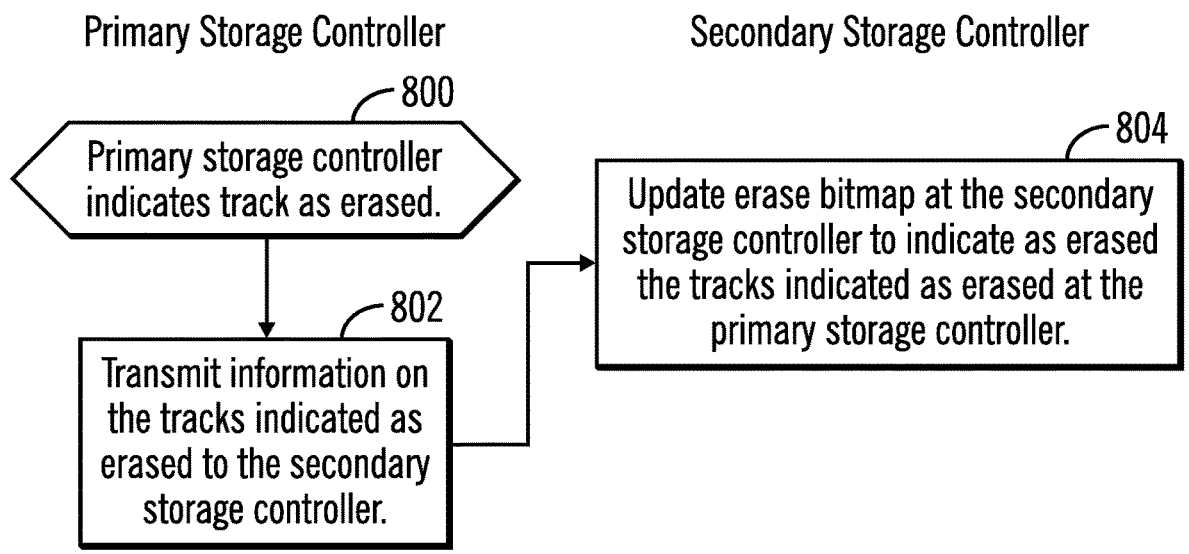
FIG. 8 illustrates an embodiment of operations to process an erase command in a data mirroring environment.

FIG. 8 illustrates an embodiment of operations performed at the primary $700_P$ and secondary $700_S$ storage controllers. When the I/O manager 108 at the primary storage controller $700_P$ indicates (at block 800) a track as erased, such as at block 202 in FIG. 2, the primary storage controller $700_P$ transmits (at block 802) information on the tracks indicated as erased to the secondary storage controller $700_S$. Upon receiving the information on the tracks indicated as erased, the secondary storage controller $700_S$ updates (at block 804) the erase bitmap 112 at the secondary storage controller $700_S$ to indicate as erased the tracks indicated as erased at the primary storage controller $700_P$.

With the embodiment of FIGS. 7 and 8, in a data mirroring environment, the primary storage controller $700_P$ communicates information on the tracks indicated as erased to the secondary storage controller $700_S$ so the secondary storage controller $700_S$ I/O manager 108 may perform the operations in FIGS. 2-6 to ensure that the tracks at the secondary storage and secondary storage controller $700_S$ that are indicated as erased are not accessed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
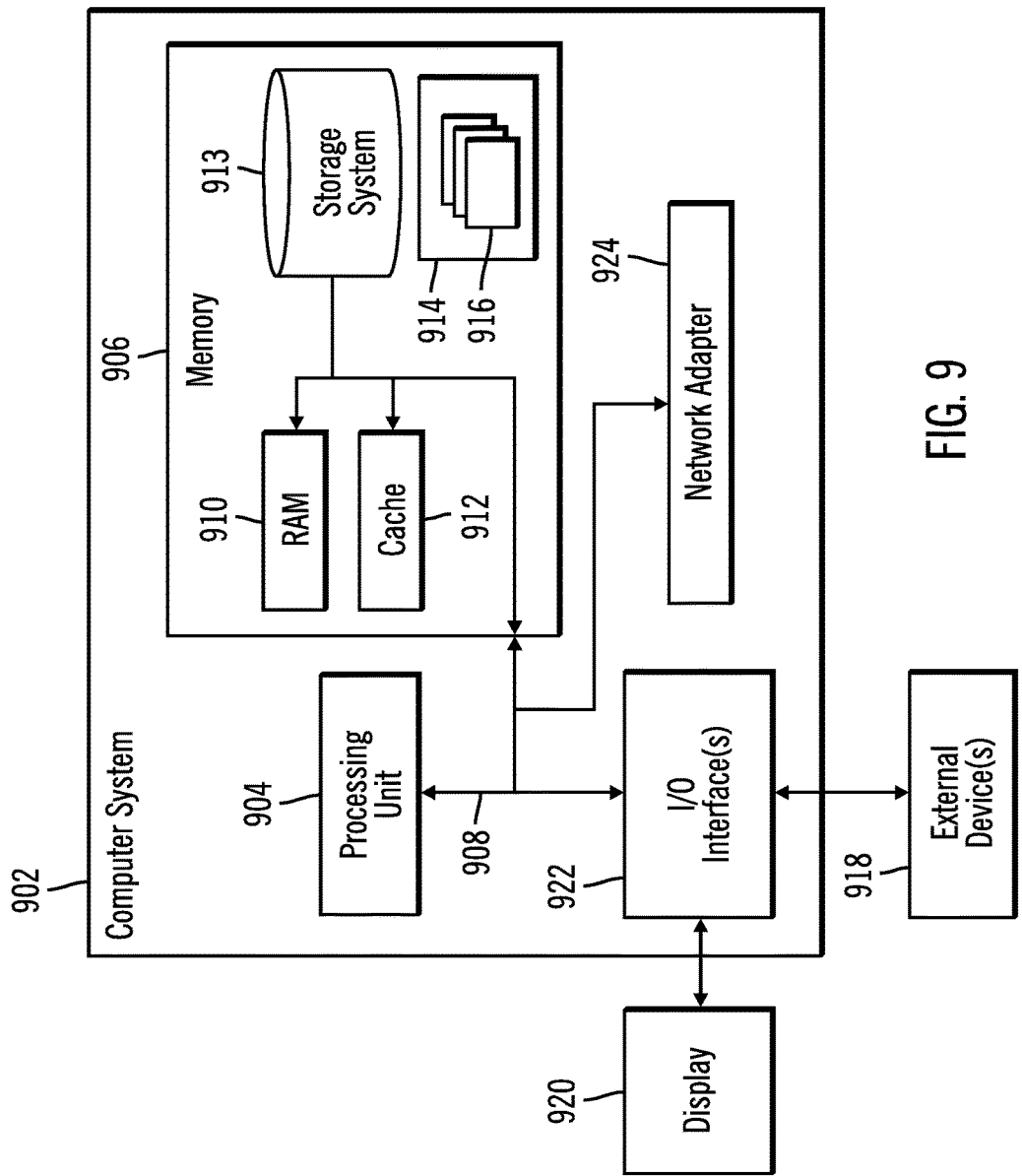
FIG. 9 illustrates a computing environment in which the components of FIG. 1 may be implemented.

The computational components of FIGS. 1 and 7, including the storage controllers 102, $700_P$, $700_S$ and host 100 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing an erase of tracks in a storage, the computer program product comprises a computer readable storage medium having program instructions embodied therewith, the program instructions executable by a processor to cause operations, the operations comprising:
   in response to receiving erase commands to erase tracks in the storage, indicating the tracks as erased without performing an erase operation on the tracks subject to the erase command, wherein data in the storage for the tracks indicated as erased remains in the storage while requests are directed to the tracks indicated as erased;
   receiving a command indicating an operation with respect to a target track;
   determining whether the target track is indicated as erased;
   permitting the operation to proceed with respect to the target track in response to determining that the target track is not indicated as erased; and
   performing an alternate operation providing a result different from the operation indicated in the command in response to determining that the target track is indicated as erased.

2. The computer program product of claim 1, wherein the operations further comprise:
   providing a bitmap including a cell for each of the tracks in the storage, wherein each cell for each track is set to a first value to indicate that the track is not erased and set to a second value to indicate that the track is erased, wherein the determining that the track is not erased comprises determining that the cell for the target track has the first value and wherein the determining that the track is erased comprises determining that the cell for the target track has the second value.

3. The computer program product of claim 1, wherein the operation indicated in the command is to read the target track, wherein the performing the alternate operation comprises returning a predetermined string of values different from data for the target track in the storage.

4. The computer program product of claim 1, wherein the operations further comprise:
   in response to the command indicating to write data to target tracks that are indicated as erased, with a format, performing:
      indicating the target tracks as not erased; and
      writing the data to the target tracks.

5. The computer program product of claim 1, wherein the operation indicated in the command is to update the target track which is indicated as being erased, wherein the performing the alternate operation comprises returning a fail to the update to the target track.

6. The computer program product of claim 1, wherein the operation indicated in the command is to update a plurality of target tracks, wherein the update is performed with respect to processing the target tracks that are not indicated as erased prior to processing a first track of the target tracks that is indicated as erased, and the alternate operation comprises returning fail in response to processing the first track of the target tracks indicated as erased.

7. The computer program product of claim 1, wherein the operations further comprise:
   returning complete to an erase command in response to indicating the target track is erased, wherein complete is returned without performing an erase operation with respect to the target track.

8. The computer program product of claim 1, wherein the operations further comprise:
   performing a background erase operation to overwrite data in the tracks that are indicated as erased; and
   indicating tracks erased as part of the background erase operation as not erased.

9. The computer program product of claim 1, wherein the computer readable storage medium is implemented at a first storage controller, and wherein the storage comprises a first storage, wherein the first storage controller mirrors data to a second storage controller over a network to store in a second storage, wherein the operations further comprise:
   transmitting indication of the tracks indicated as erased to the second storage controller to cause the second storage controller to indicate the tracks, indicated as erased at the first storage controller, as indicated as erased at the second storage controller, wherein the second storage controller performs the determining whether the target track is indicated as erased, permitting the operation to proceed, and performing the alternate operation with respect to receiving commands indicating operations with respect to target tracks at the second storage.

10. A system for performing an erase of tracks in a storage, comprising:
   a processor; and
   a computer readable storage medium having program instructions embodied therewith, the program instructions executable by the processor to cause operations, the operations comprising:
      in response to receiving erase commands to erase tracks in the storage, indicating the tracks as erased without performing an erase operation on the tracks subject to the erase command, wherein data in the storage for the tracks indicated as erased remains in the storage while requests are directed to the tracks indicated as erased;
      receiving a command indicating an operation with respect to a target track;
      determining whether the target track is indicated as erased;
      permitting the operation to proceed with respect to the target track in response to determining that the target track is not indicated as erased; and
      performing an alternate operation providing a result different from the operation indicated in the command in response to determining that the target track is indicated as erased.

11. The system of claim 10, wherein the operation indicated in the command is to read the target track, wherein the performing the alternate operation comprises returning a predetermined string of values different from data for the target track in the storage.

12. The system of claim 10, wherein the operations further comprise:
   in response to the command indicating to write data to target tracks that are indicated as erased, with a format, performing:
      indicating the target tracks as not erased; and
      writing the data to the target tracks.

13. The system of claim 10, wherein the operation indicated in the command is to update the target track which is indicated as being erased, wherein the performing the alternate operation comprises returning a fail to the update to the target track.

14. The system of claim 10, wherein the operations further comprise:
   returning complete to an erase command in response to indicating the target track is erased, wherein complete is returned without performing an erase operation with respect to the target track.

15. The system of claim 10, wherein the computer readable storage medium is implemented at a first storage controller, and wherein the storage comprises a first storage, wherein the first storage controller mirrors data to a second storage controller over a network to store in a second storage, wherein the operations further comprise:
   transmitting indication of the tracks indicated as erased to the second storage controller to cause the second storage controller to indicate the tracks, indicated as erased at the first storage controller, as indicated as erased at the second storage controller, wherein the second storage controller performs the determining whether the target track is indicated as erased, permitting the operation to proceed, and performing the alternate operation with respect to receiving commands indicating operations with respect to target tracks at the second storage.

16. A method for performing an erase of tracks in a storage, comprising:
   in response to receiving erase commands to erase tracks in the storage, indicating the tracks as erased without performing an erase operation on the tracks subject to the erase command, wherein data in the storage for the tracks indicated as erased remains in the storage while requests are directed to the tracks indicated as erased;
   receiving a command indicating an operation with respect to a target track;
   determining whether the target track is indicated as erased;
   permitting the operation to proceed with respect to the target track in response to determining that the target track is not indicated as erased; and
   performing an alternate operation providing a result different from the operation indicated in the command in response to determining that the target track is indicated as erased.

17. The method of claim 16, wherein the operation indicated in the command is to read the target track, wherein the performing the alternate operation comprises returning a predetermined string of values different from data for the target track in the storage.

18. The method of claim 16, further comprising:
   in response to the command indicating to write data to target tracks that are indicated as erased, with a format, performing:
      indicating the target tracks as not erased; and
      writing the data to the target tracks.

19. The method of claim 16, wherein the operation indicated in the command is to update the target track which is indicated as being erased, wherein the performing the alternate operation comprises returning a fail to the update to the target track.

20. The method of claim 16, further comprising:
   returning complete to an erase command in response to indicating the target track is erased, wherein complete is returned without performing an erase operation with respect to the target track.

21. The method of claim 16, wherein the storage comprises a first storage, wherein a first storage controller mirrors data to a second storage controller over a network to store in a second storage, further comprising:
   transmitting indication of the tracks indicated as erased to the second storage controller to cause the second storage controller to indicate the tracks, indicated as erased at the first storage controller, as indicated as erased at the second storage controller, wherein the second storage controller performs the determining whether the target track is indicated as erased, permitting the operation to proceed, and performing the alternate operation with respect to receiving commands indicating operations with respect to target tracks at the second storage.

* * * * *